United States Patent [19]

Fajans

[11] 4,170,931
[45] Oct. 16, 1979

[54] HEATING DEVICE FOR A PERCOLATOR AND METHOD OF USING THE SAME

[76] Inventor: Jack Fajans, 1133 Magnolia Rd., Teaneck, N.J. 07666

[21] Appl. No.: 855,295

[22] Filed: Nov. 28, 1977

Related U.S. Application Data

[63] Continuation-in-part of Ser. No. 646,409, Jan. 2, 1976.

[51] Int. Cl.$^2$ ............................................. A47J 31/44
[52] U.S. Cl. ..................................... 99/312; 126/390; 219/433; 219/462
[58] Field of Search ................ 99/310, 311, 312, 313, 99/314, 315, 279, 288; 219/433, 462, 402, 405; 126/390; 426/433

[56] References Cited

U.S. PATENT DOCUMENTS

| | | | |
|---|---|---|---|
| 992,262 | 5/1911 | Savage | 99/311 |
| 1,309,374 | 7/1919 | Swan | 99/311 |
| 3,068,777 | 12/1962 | Pedalino | 99/312 |
| 3,313,919 | 4/1967 | Richardson | 219/433 |
| 3,429,255 | 2/1969 | Pedalino | 99/312 |
| 3,785,274 | 1/1974 | Yamamoto | 126/390 |

*Primary Examiner*—Robert W. Jenkins
*Attorney, Agent, or Firm*—Toren, McGeady and Stanger

[57] ABSTRACT

Better coffee is made in a conventional percolator when the percolator is heated on a metal heating plate having a planar top surface and a locating recess centered in the surface. A small metal spacer having two oppositely directed, substantially planer and parallel faces is provided with a fixed locating projection on one of its faces. The dimensions of the projection permit it to be slidably received in the locating recess of the plate so that the bottom face of the spacer makes heat-transmitting area contact with the surface of the plate. When a water-filled percolator is placed on the top surface of the heating plate in the absence of the spacer, the water may be quickly heated almost to a boil. When the spacer then is inserted and the percolator centered on the top face of the spacer, direct heating of the water in the percolator is limited to water in the pumping assembly of the percolator during coffee brewing.

8 Claims, 4 Drawing Figures

HEATING DEVICE FOR A PERCOLATOR AND METHOD OF USING THE SAME

This application is a continuation-in-part of my co-pending application Ser. No. 646,409, filed on Jan. 2, 1976.

In the earlier application, I disclosed and claimed a method of making better coffee on a conventional, simple percolator, an arrangement for performing the method, and a metal disc for use in the method as an element of the arrangement. I had found that a conventional percolator produces better coffee on a conventional heater, particularly an electric heater, if a flat disc carrying a central projection is releasably interposed between the heater and the bottom wall of the percolator in weight and heat transmitting engagement of the lower disc face with the heater while only the small, raised, central portion of the top face of the disc engages the center of the bottom wall of the percolator below the pumping unit. Heat sufficient for vigorous pumping and percolating is supplied to the aqueous liquid in the pumping unit while the remainder of the liquid, more specifically, coffee extract in the percolator space surrounding the pumping unit, remains relatively cool and does not lose its flavor.

While the disc of the earlier invention is effective in producing better coffee than could be had by placing the percolator directly on the heater, it takes relatively long to heat the water in the percolator vessel to the temperature required for percolation by means of thermal energy flowing through the restricted path provided by the raised central disc portion, and the coffee produced deteriorates if percolating is not stopped within a critical period of 2-3 minutes.

It is a primary object of this invention to provide an improved disc or plate for use between a conventional percolator and a conventional heater in brewing coffee which reduces to a minimum the care and skill required of a cook for best results.

Another object is the provision of a method of brewing coffee at least as good as can be made according to my earlier invention in a shorter time.

With these and other objects in view, as will hereinafter become apparent, the invention provides a heating device for a coffee percolator which comprises a plate having a planar, annular surface and formed with a locating recess in the surface. A spacer has two spaced, oppositely directed, substantially planar and parallel faces of which one is smaller than the plate surface. A locating projection is fixed on the other face of the spacer and dimensioned for being slidably received in the recess of the plate. The received projection locates the spacer in a position in which its other face makes heat transmitting area contact with the plate surface while the one face and the plate surface are transversely spaced from each other. The plate, spacer, and projection consist essentially of heat conducting metal.

In brewing coffee by means of the afore-described heating device, thermal energy is supplied to the plate. A percolator including a vessel containing water and having a bottom wall of sheet material is placed on the surface of the plate in heat transmitting, direct contact until the temperature of the water in the vessel is raised to near its boiling temperature by thermal energy transmitted from the plate. As is conventional, the percolator has a pumping tube extending upward from a central portion of the bottom wall and a coffee receptacle communicating with the upper terminal portion of the tube.

The percolator carrying the boiling hot water and coffee in the receptacle is lifted briefly from the plate surface, and the projection of the spacer is inserted in the recess of the plate. When the percolator thereafter is placed on the spacer in vertical alignment of the pumping tube with the top face of the spacer, and heat transmitting contact is maintained between the plate, the spacer, and the bottom wall of the percolator vessel, steam is formed in the pumping tube by thermal energy transmitted from the plate to the water by the spacer, and percolating commences while heating of the circumferential portion of the percolator vessel is reduced or prevented by an air gap between the bottom wall and the plate.

Other features, additional objects, and many of the attendant advantages of this invention will readily be appreciated as the same becomes better understood from the following detailed description of preferred embodiments when considered in connection with the appended drawing in which.

Figure 1:
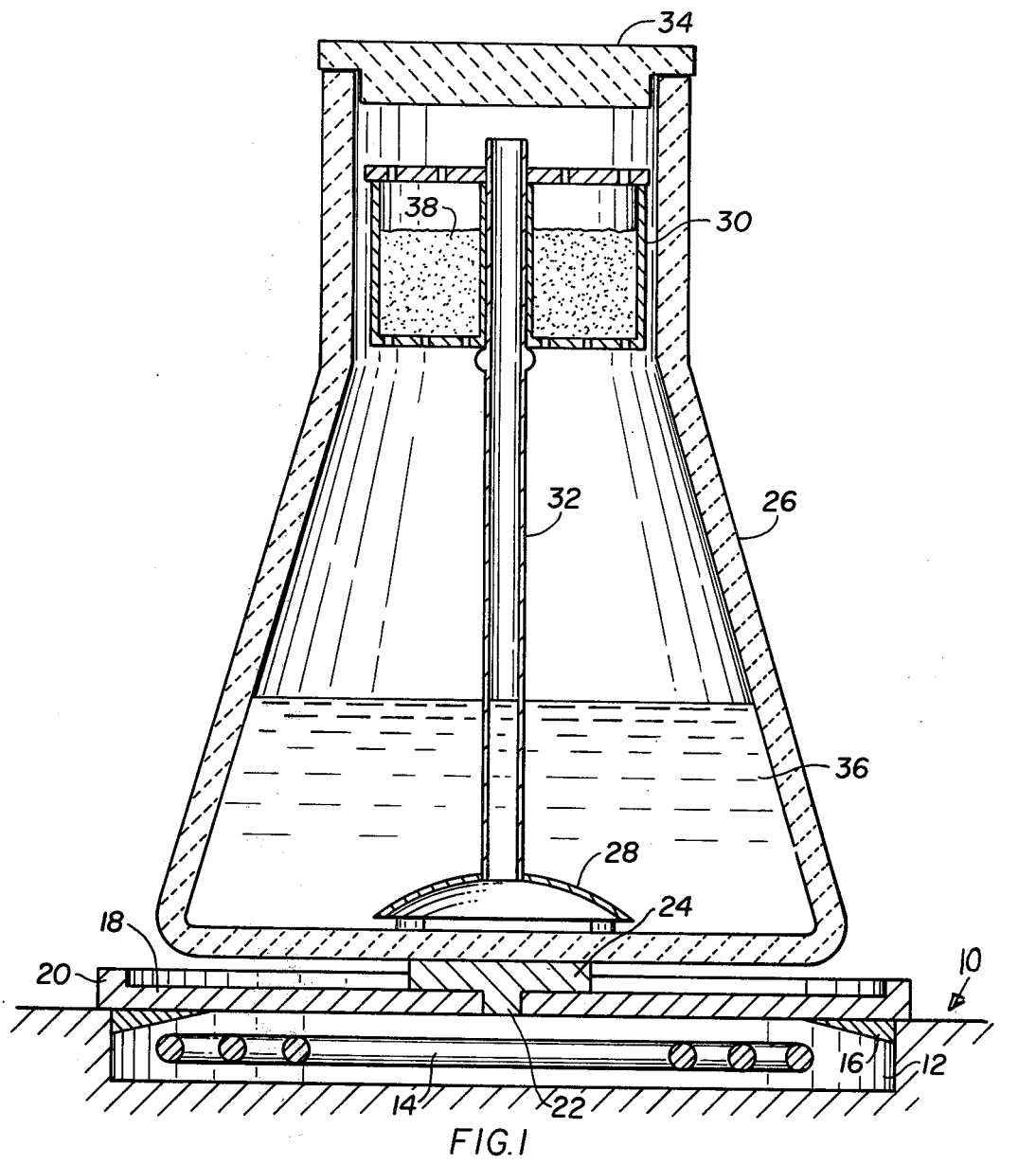
FIG. 1 shows a coffee brewing arrangement of the invention in fragmentary, elevational section.

Referring initially to FIG. 1, there is shown a portion of an electric stove 10. A shallow well 12 in the horizontal top surface of the stove accommodates an electric heating coil 14. Brackets 16 at the circumference of the well 12 carry a heating plate 18. The plate 18 is a generally flat, circular piece of aluminum having a raised rim 20 for better warp resistance and a central, axial, locating passage in which an integral, central, cylindrical pin 22 on the bottom face of a circular spacer disc 24 is slidably received, the radial clearance between the pin 22 and the plate 18 being too small for pictorial representation on the scale of FIG. 1. The flat bottom face of the spacer disc 24 makes weight and heat transmitting area contact with the top surface of the plate 18, and similar contact exists between the top surface of the spacer disc 24 and the flat, bottom wall of a percolator glass vessel 26 having the general shape of an Erlenmeyer flask.

The hollow, spherically arcuate base 28 of a pumping assembly is held centered on the bottom wall by a perforated coffee receptacle 30 mounted on the terminal top portion of a pumping tube 32 releasably inserted in the receptacle 30, the bottom end of the tube 32 being fixedly fastened to the base 28. The receptacle 30 loosely fits into the neck of the vessel 26 which is upwardly closed by a loose cover 34. Water 36 fills the lower third of the vessel 26.

The apparatus shown in FIG. 1 may be operated as the structural and functional equivalent of the heating arrangement described in my earlier application. When the coil 14 is energized, thermal energy is supplied to the plate 18 and transmitted by the spacer 24 to the central wall portion of the vessel 26 under the base 28. Water may enter the cavity of the base in a radial direction. When the water under the base 28 reaches boiling temperature, a mixture of water and steam in the tube 32 is raised by the hydrostatic pressure of the colder water in the circumferential portion of the vessel 26 and flows from the tube 32 into the communicating receptacle 30 for contact with ground coffee 38 in the receptacle. The resulting coffee extract drips from the perforated receptacle 30 into the body of water around the base 28 which is protected against direct heat transfer from the plate 18 by an air gap equal in height to the thickness of the spacer 24.

It is preferred to employ the arrangement shown in FIG. 1 in a different manner. When the spacer 24 is initially removed, and the bottom wall of the vessel 26 is placed directly on the top surface of the heating plate 18, thermal energy is transmitted from the heating coil 14 to the water 36 in the vessel 26 much more quickly than in the illustrated arrangement, and it is safe to heat the water almost to its boiling point before the pumping assembly becomes effective.

Thereafter, the vessel 26 is briefly lifted from the plate 18, the spacer 24 is inserted as shown, and heating of the water 36 is continued, but limited by the spacer 24 to the water portion under the base 28. During subsequent percolating, the coffee extract collecting in the bottom of the vessel 26 is at boiling temperature only while in the pumping assembly 28, 30, 32. It is protected against excessive loss of volatile ingredients during protracted steam distillation by the air gap between the circumferential portions of the plate 18 and the vessel 26.

It has been found that insertion of the pumping assembly and of the coffee 38 into the vessel 26 may be delayed until the water 36 has been brought to a temperature near its boiling temperature, and that the coil 14 may be deenergized as soon as the spacer 24 is inserted and the vessel 26 positioned on it. Heat stored in the plate 18 is sufficient to cause percolating for the usually preferred period of about 5–6 minutes if the plate 18 is suitably dimensioned to match the capacity of the vessel 26.

It is an advantage of such a mode of operation that it requires only minimal attention on the part of the cook. As long as the pumping assembly 28, 30, 32 and the coffee 38 are not in the percolator, no harm is done if the water 36 is left to boil much longer than needed. After insertion of the pumping assembly and of the coffee into the percolator vessel 26, insertion of the spacer 24 into the plate 18, and shutting off of the coil 14, there will be produced good coffee which cannot be spoiled by overly long percolation. The plate 18 will provide enough heat to keep the coffee hot for some time after percolating stops.

The plate 18 and spacer 24 may be employed for making coffee on a gas stove in substantially the same manner, and other sources of thermal energy may be resorted to in an obvious manner. Actually, an electric heating coil, not significantly different from the illustrated coil 14, may be embedded in the plate 18 in an obvious manner.

Numerous other modifications of the disc 18 and also of the spacer 24 will readily suggest themselves to those skilled in the art. Metals other than aluminum may be employed for making the plate 18 and the spacer 24 shown in FIG. 1. Steel has been found to have adequate heat conductivity, and a heating plate made of steel about one eighth of an inch thick does not need a raised rim for warp resistance on an electric heater.

Figure 2:
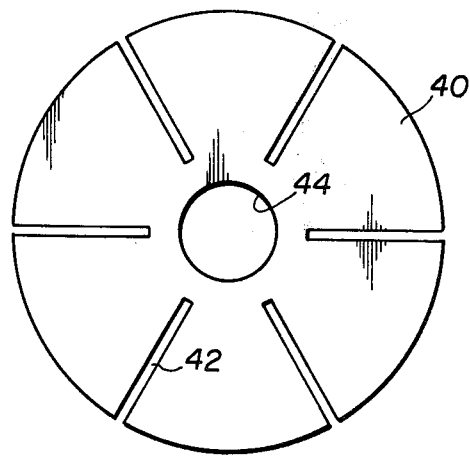
FIG. 2 illustrates a modified heating plate for use in the arrangement of FIG. 1 in top plan view on a reduced scale.

FIG. 2 shows a steel heating plate 40 that has been used successfully in the otherwise unchanged heating arrangement of FIG. 1. Any tendency of the plate to warp under thermal stresses is eliminated by six, equiangularly spaced, radial slots 42 extending from the outer circumference of the plate 40 toward a central locating aperture 44, the length of each slot being equal to or greater than one half of the plate radius.

A central locating aperture in a heating plate has been found to expose the central portion of the percolator bottom to higher temperatures than the remainder of the bottom wall when the apertured plate and a percolator vessel supported on the same are placed over the flames of a gas burner. Such uneven heating may cause warping of a metal bottom wall and even cracking of a glass bottom wall of a percolator.

Figure 3:
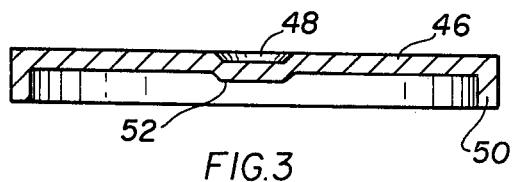
FIG. 3 is a sectional, elevational view of yet another heating plate.

FIG. 3 shows a modified aluminum heating plate 46 on which a spacer projection may be centered in a relatively shallow, downwardly sealed recess 48. For ease of manufacturing, a circumferential rim 50 projects axially downward from the generally flat main portion of the plate 46, and the recess 48 is formed simultaneously with the rim 50 in a stamping operation which produces a projection 52 on the bottom surface of the plate when the recess 48 is formed on the top surface, thus maintaining a practically uniform thickness of the 3/16" sheet aluminum from which the plate 46 is made.

Figure 4:
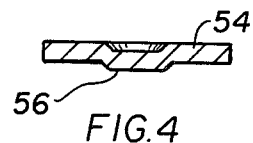
FIG. 4 shows a spacer for use with the heating plate of FIG. 3 in a corresponding sectional view.

A spacer 54 suitable for use with the plate 46 is shown in FIG. 4. It is made from 1/32" aluminum sheet by stamping to form a central locating projection 56 on the bottom face of the spacer and a corresponding recess in the top face. As is not explicitly shown, the two major faces of the spacer 54 have each the shape of an equilateral triangle for better support of a superimposed percolator vessel without spreading significant thermal energy beyond the water under the base 28 of the percolator pumping unit.

Available materials and manufacturing equipment and the heaters intended to be used may make it convenient to choose a non-circular shape for the heating plate of the invention and further modifications in the shape of the associated spacer. It is important, though, that the heating plate have an annular surface about the locating recess which is capable of making area contact with the bottom face of the spacer. While such contact may be achieved by mating conical surfaces, for example, only substantially planar contact areas are practical at this time.

The top face of the spacer must be shaped for area contact with the bottom wall of the percolator. Percolator bottoms sometimes may be warped accidentally or due to manufacturing tolerances, but the intended applicability of the heating device to any conventional percolator is best served by a top face which is substantially planar and substantially parallel to the bottom face. The sliding fit of the spacer projection in the locating recess of the heating plate and the necessary clearance gap significantly impede heat transfer between the plate and the projection, and rapid percolation cannot be had if adequate heat transfer is not achieved between the plate surface and the engaged bottom face of the spacer.

At least the heating plate portion engaging the bottom wall of the percolator should be of uniform thickness for even spreading of the heat supplied during the water preheating stage. The portion of the spacer upwardly bounded by the top face should be of uniform thickness for analogous reasons. Other dimensions will be chosen for the best available combination of heat transfer characteristics and stable support of the percolator on the heating device. Thus, the diameter of the planar annular heating plate surface should be at least three times the diameter of the top face of the spacer if the surface and face are circular, and analogous dimensional relationships should be maintained with surfaces and faces shaped differently. Because of the relatively unfavorable heat transmission through the locating projection of the spacer even when integral with the main body of the spacer, the cross sectional area of the locating recess in the heating plate surface should not exceed the area of a circle having a diameter equal to two thirds of the diameter of the top face of the spacer.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A heating device for a percolator comprising:
    (a) a plate member of heat conducting metal having a planar, annular surface;
    (b) a spacer member of heat conducting metal having two spaced, oppositely directed, substantially planar and parellel faces, one of said faces being smaller than said surface; and
    (c) cooperating locating means on a central portion of said surface and on the other face of said spacer member for substantially centering said spacer member on said surface.

2. A device as set forth in claim 1, wherein said locating means include a projection on said other face, said central portion being formed with a locating recess, said projection being dimensioned for being received slidably in said recess, the received projection locating said spacer member in a position in which said other face makes heat-transmitting area contact with said surface, whereby said one face and said surface are transversely spaced from each other.

3. A device as set forth in claim 2, wherein said surface and said one face are circular, the diameter of said surface being at least three times the diameter of said one face.

4. A device as set forth in claim 3, wherein the cross sectional area of said recess in the plane of said surface is not greater than the area of a circle having a diameter equal to two thirds of the diameter of said one face.

5. A device as set forth in claim 2, wherein said locating projection and said spacer member jointly constitute a unitary piece of metal.

6. A device as set forth in claim 1, wherein said surface bounds a portion of said plate member of uniform thickness at right angles to said surface.

7. A device as set forth in claim 1, wherein said one face bounds a portion of said spacer member of uniform thickness between said faces thereof.

8. A coffee brewing arrangement comprises:
    (a) a percolator including
        (1) a vessel having a bottom wall downwardly bounding a cavity in said vessel,
        (2) a pump assembly in said cavity including a hollow base covering a central portion of said bottom wall, a tube extending upward from said base and having an upper orifice spaced from said base, and a perforated coffee basket mounted on said tube subjacent said upper orifice;
    (b) a heater defining a horizontal, upwardly directed supporting surface; and
    (c) a heating device as set forth in claim 1 interposed between said percolator and said heater,
        (1) said one face of said spacer member movably engaging said central portion of said bottom wall in weight transmitting relationship
        (2) said other face engaging said annular surface in weight transmitting relationship and being movable away from said surface,
        (3) an annular peripheral portion of said annular surface defining an air gap with said bottom wall,
        (4) said plate member movably engaging said heater in said supporting surface in weight transmitting relationship.